E. M. COBB.
MACHINE FOR MAKING SOLDER HEMMED CAPS.
APPLICATION FILED NOV. 24, 1909.
983,208.
Patented Jan. 31, 1911.
10 SHEETS—SHEET 1.
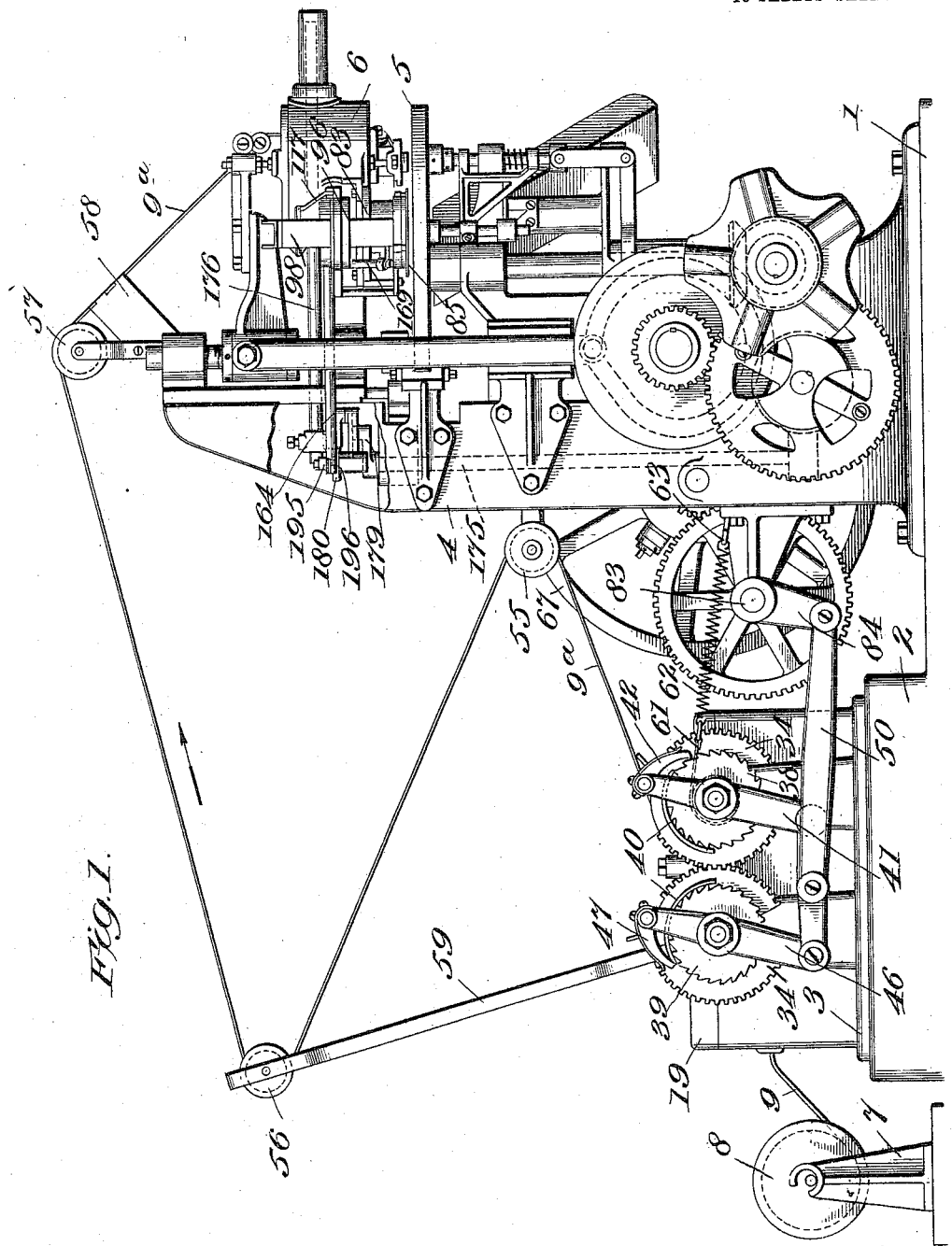

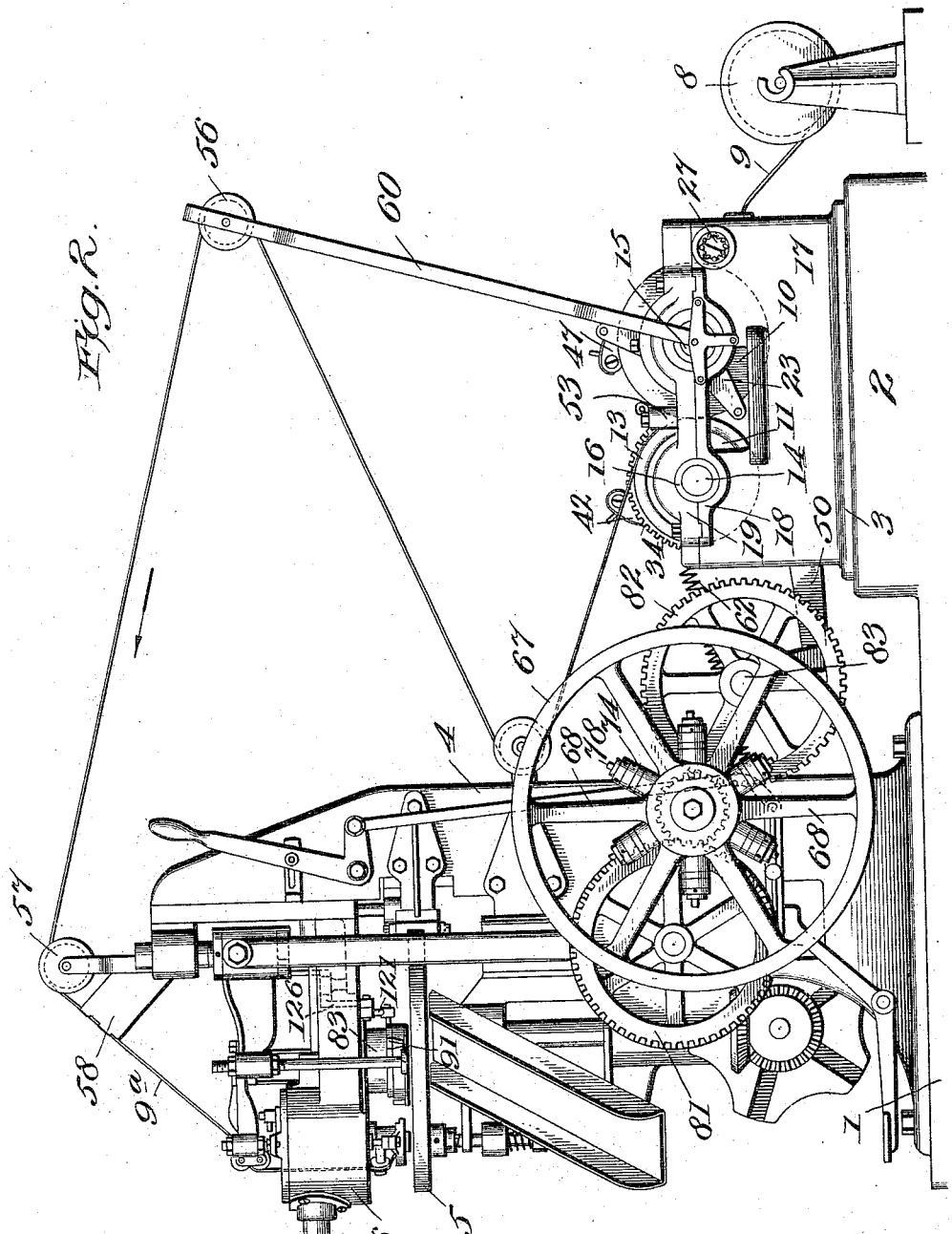

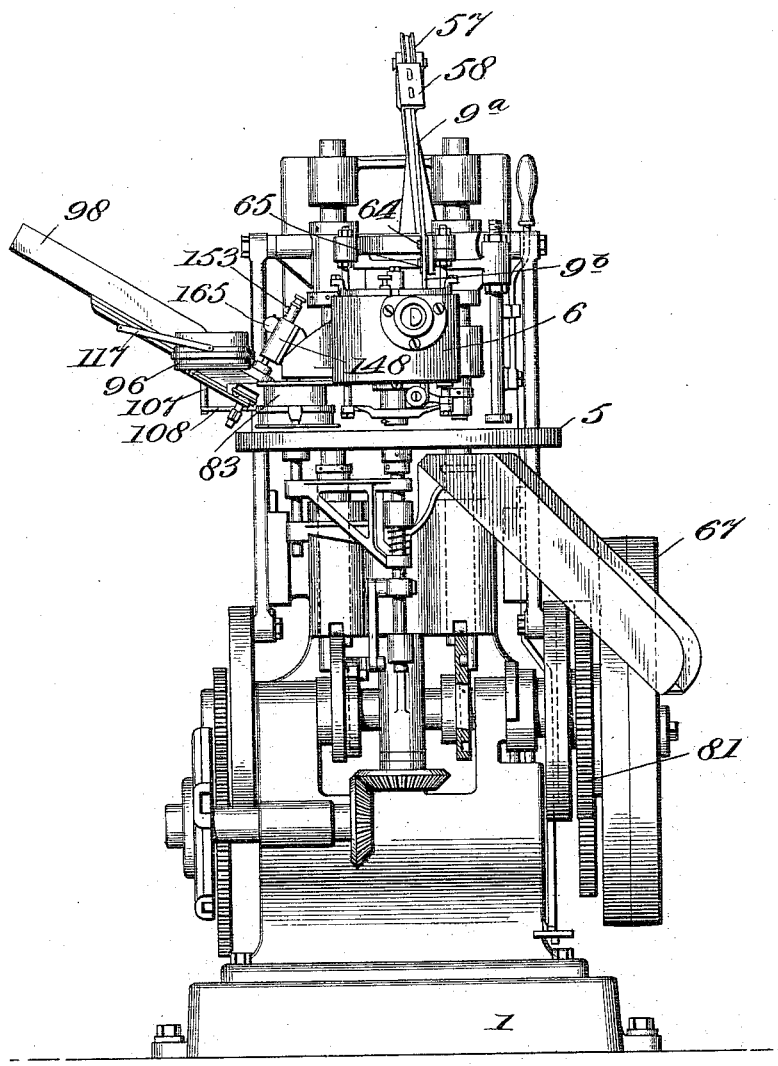

E. M. COBB.
MACHINE FOR MAKING SOLDER HEMMED CAPS.
APPLICATION FILED NOV. 24, 1909.
983,208.
Patented Jan. 31, 1911.
10 SHEETS—SHEET 4.
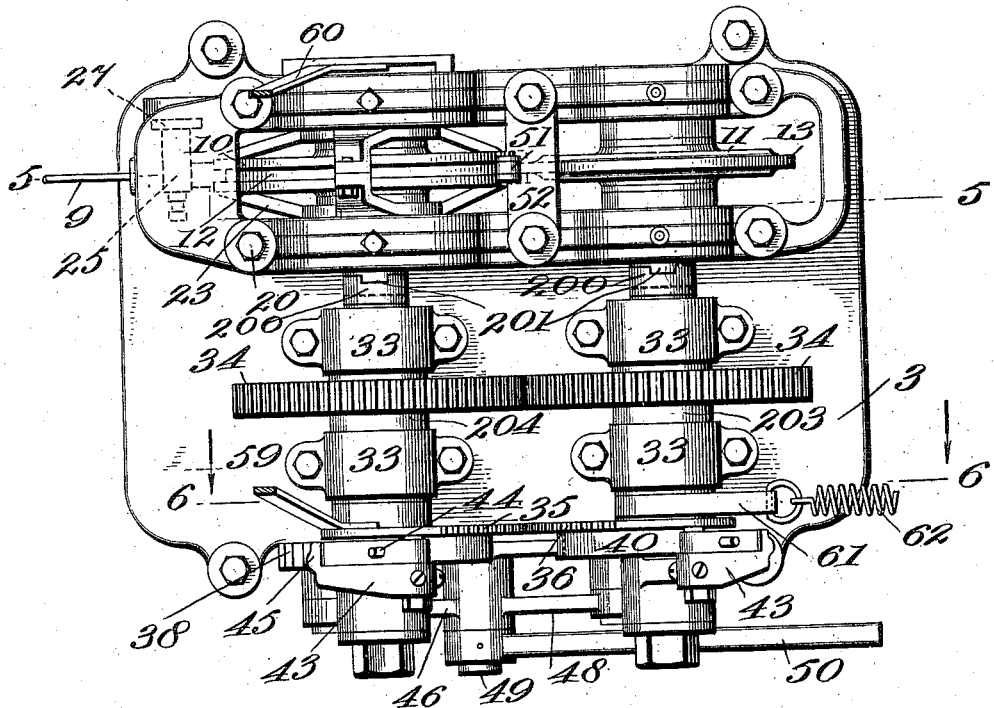
Fig. 4.   Fig. 4.ª
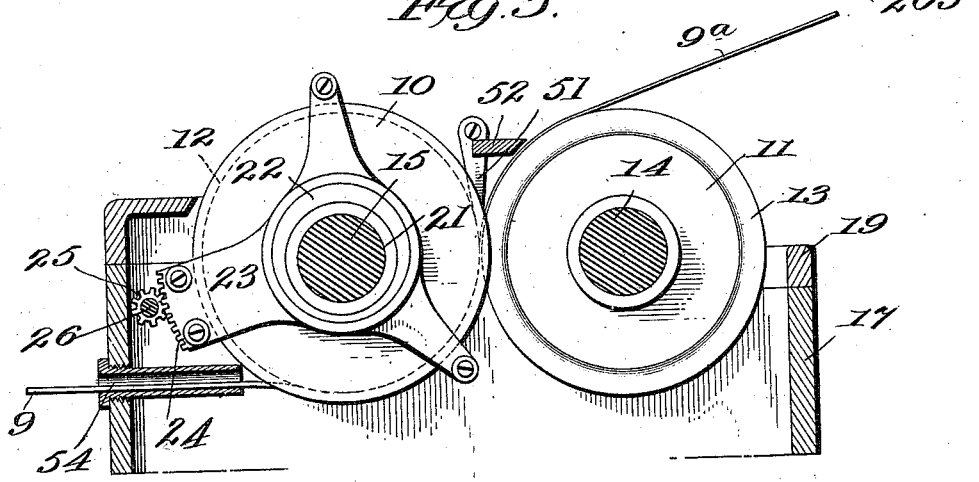
Fig. 5.
Witnesses
Geo. A. Byrne
B. B. Collings
Inventor
Elmer M. Cobb
By Wilkinson, Fisher & Witherspoon
Attorneys E. M. COBB.
MACHINE FOR MAKING SOLDER HEMMED CAPS.
APPLICATION FILED NOV. 24, 1909.
983,208.
Patented Jan. 31, 1911.
10 SHEETS—SHEET 5.
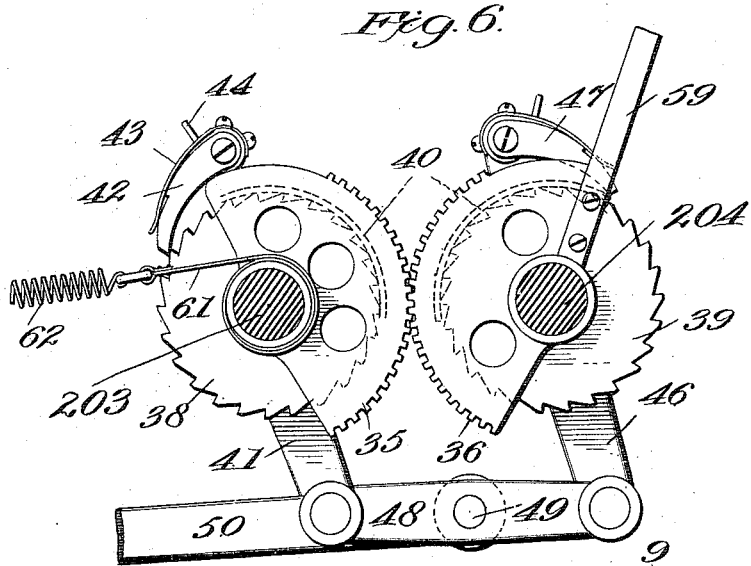
Witnesses
Geo. A. Byrne
B. B. Collings
Inventor
Elmer M. Cobb
By Wilkinson, Fisher & Witherspoon
Attorneys E. M. COBB.
MACHINE FOR MAKING SOLDER HEMMED CAPS.
APPLICATION FILED NOV. 24, 1909.
983,208.
Patented Jan. 31, 1911.
10 SHEETS—SHEET 6.
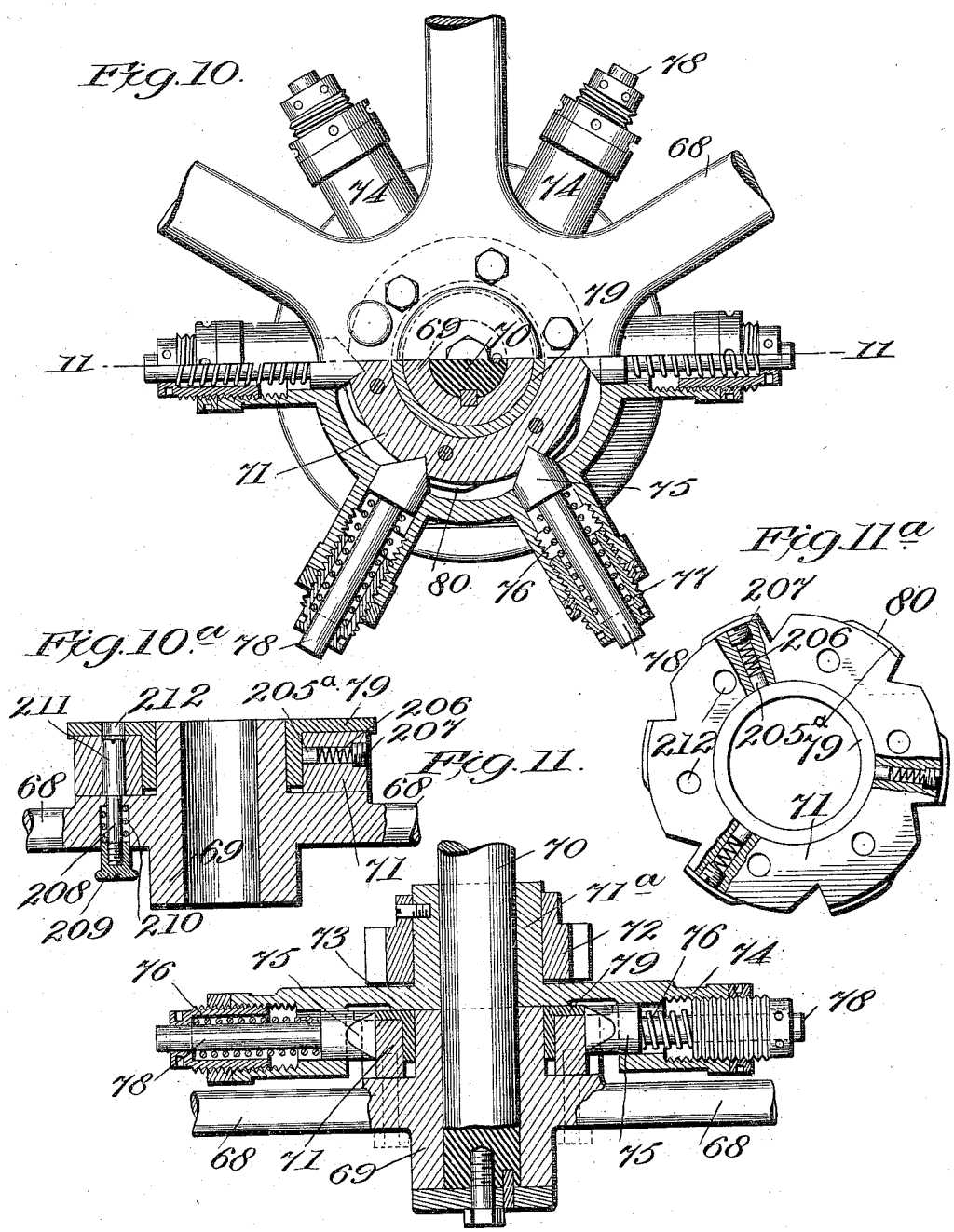

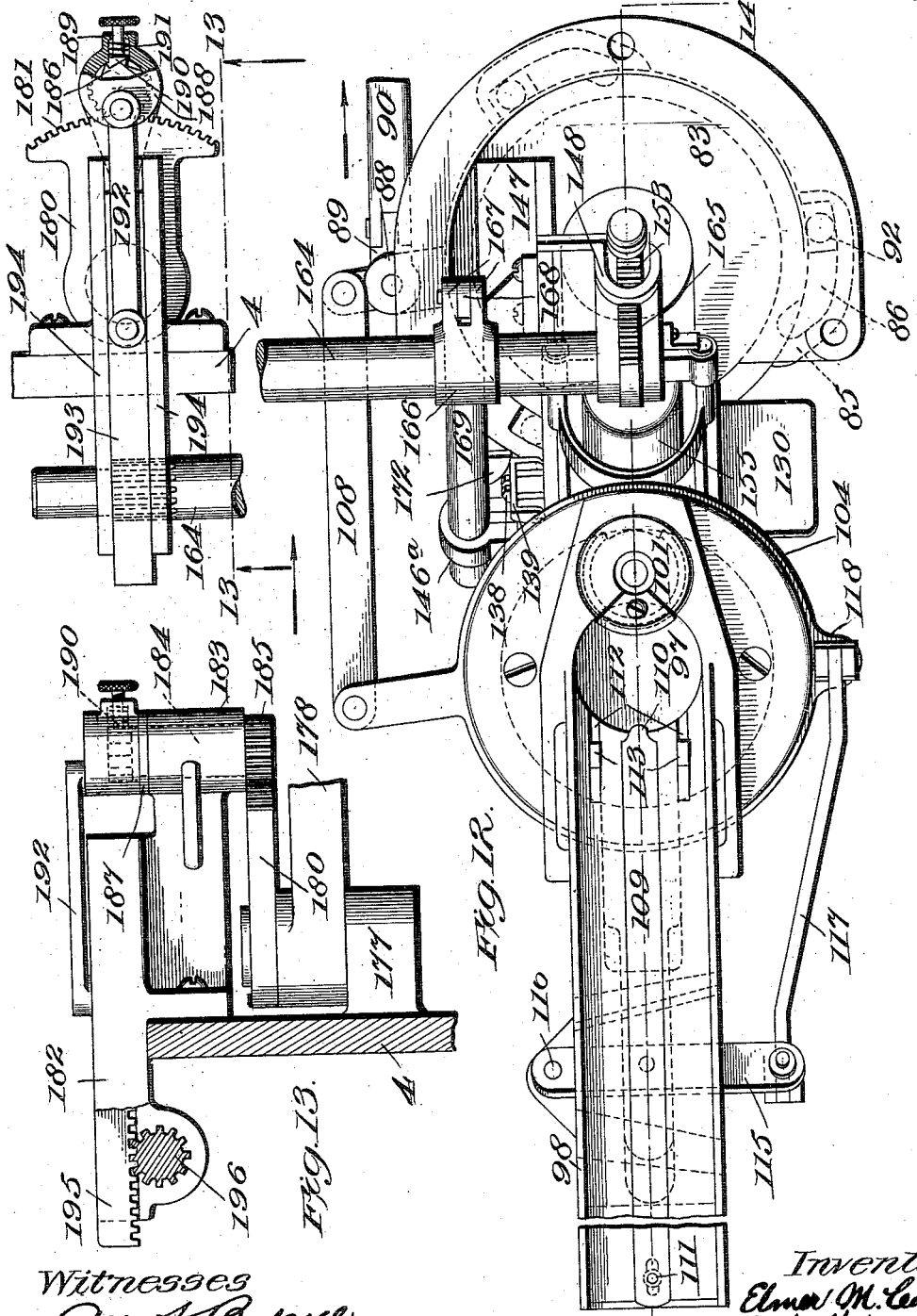

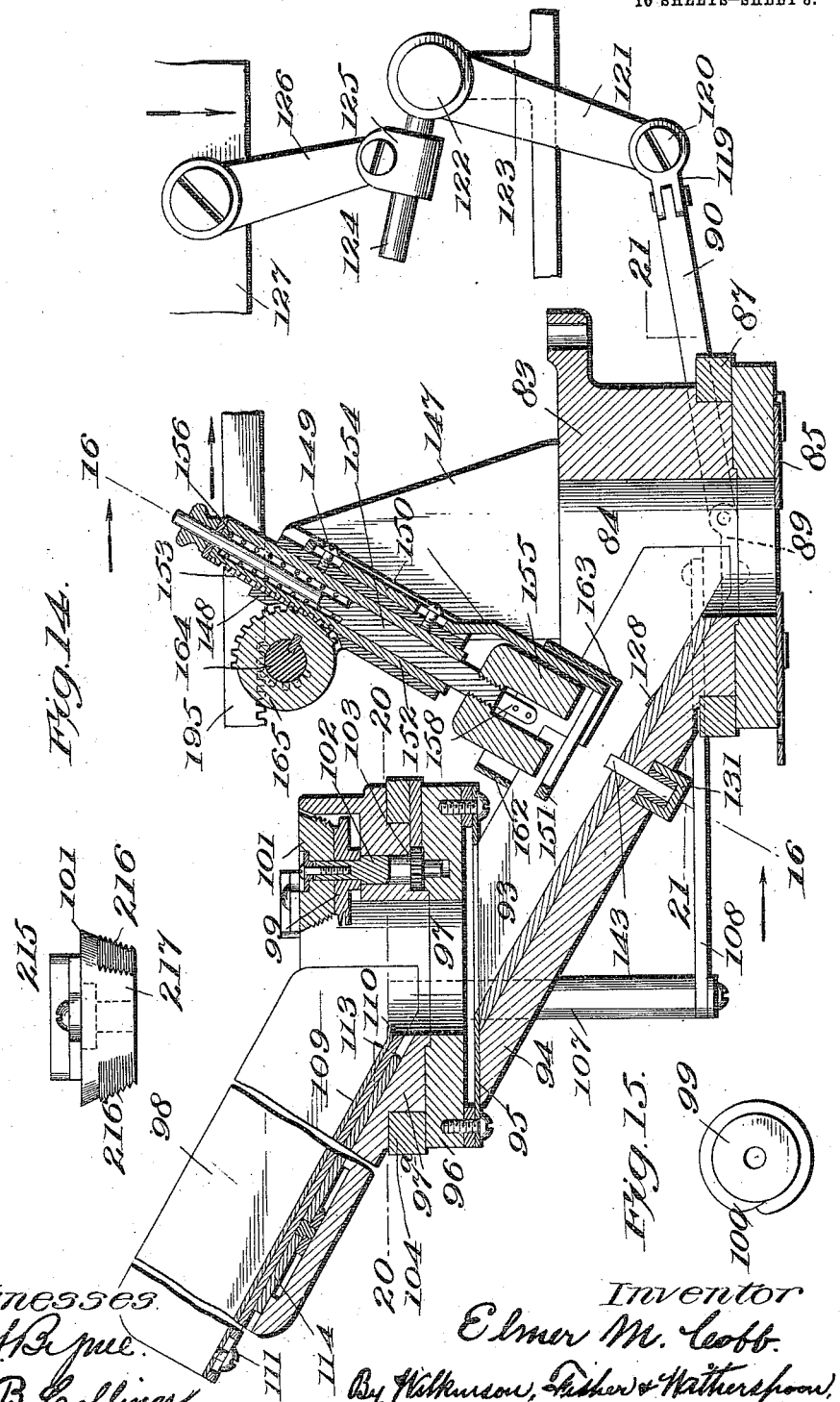

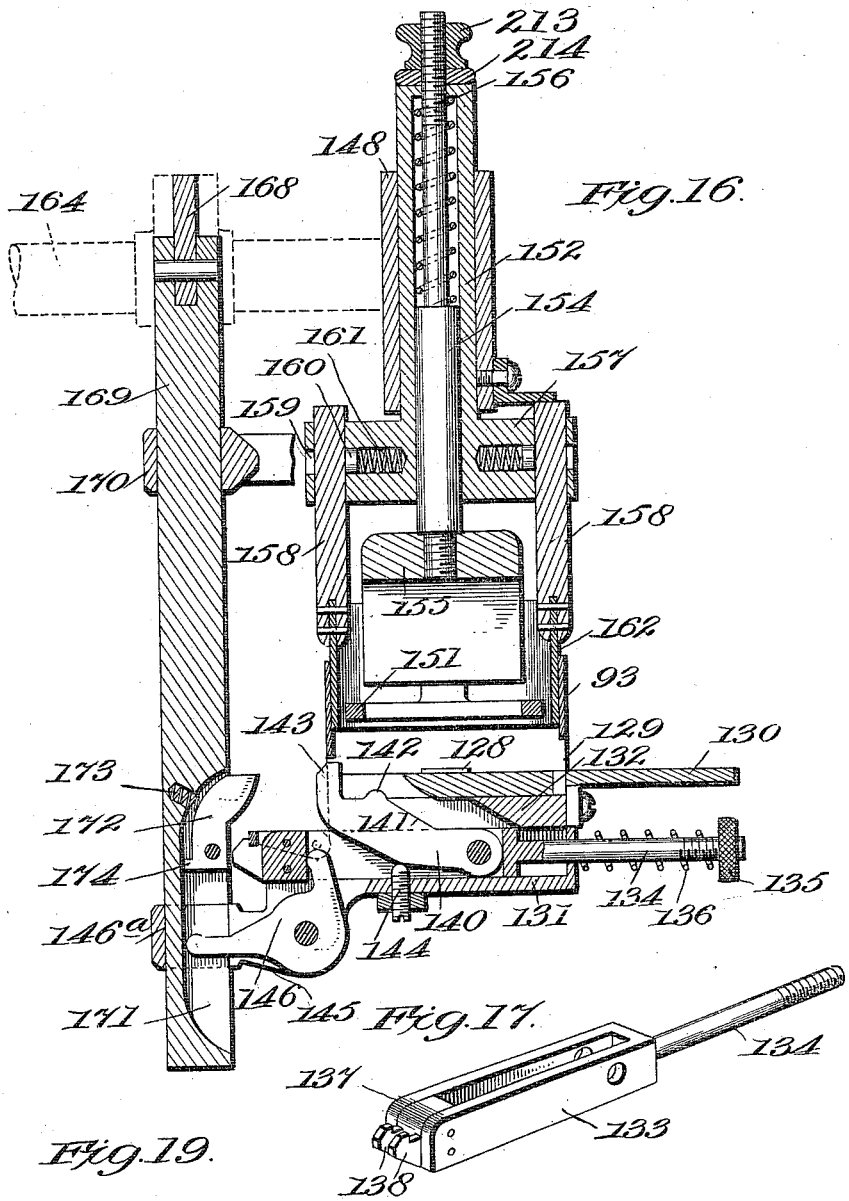

E. M. COBB.
MACHINE FOR MAKING SOLDER HEMMED CAPS.
APPLICATION FILED NOV. 24, 1909.
983,208.
Patented Jan. 31, 1911.
10 SHEETS—SHEET 10.
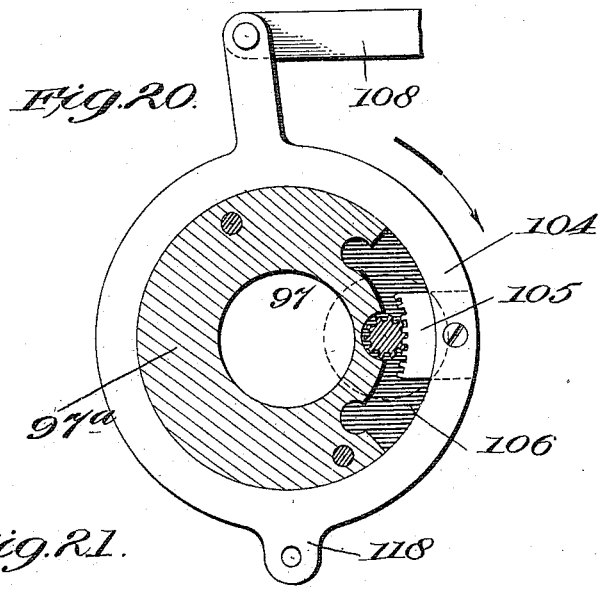
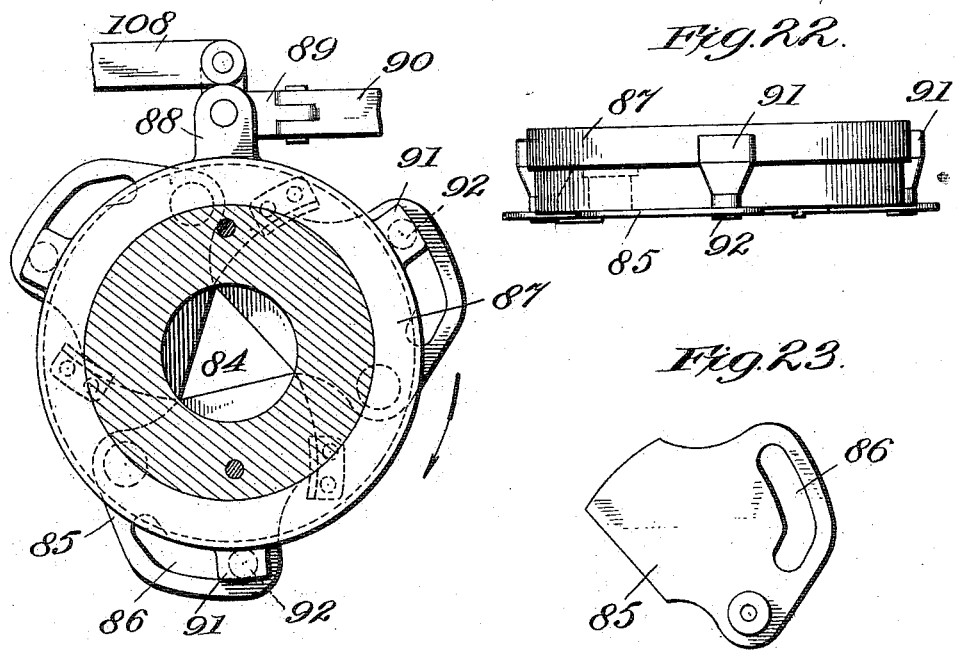
Witnesses
Geo. A. Byrne.
B. B. Collings.
Inventor
Elmer M. Cobb.
By Wilkinson, Fisher & Witherspoon,
Attorneys

UNITED STATES PATENT OFFICE.

ELMER M. COBB, OF SOUTH PORTLAND, MAINE, ASSIGNOR TO EDWARD M. LANG, JR., OF PORTLAND, MAINE.

MACHINE FOR MAKING SOLDER-HEMMED CAPS.

983,208.

Specification of Letters Patent.

Patented Jan. 31, 1911.

Application filed November 24, 1909. Serial No. 529,829.

*To all whom it may concern:*

Be it known that I, ELMER M. COBB, a citizen of the United States, residing at South Portland, in the county of Cumberland and State of Maine, have invented certain new and useful Improvements in Machines for Making Solder-Hemmed Caps; and I do hereby declare the following to be a full, clear, and exact description of the invention, such as will enable others skilled in the art to which it appertains to make and use the same.

My invention relates to improvements in machines for making solder hemmed caps, this application covering an improvement upon my former application filed November 2, 1906, Serial No. 341,757.

The object of my invention is to provide means whereby a flat ribbon or strip of solder may be formed, and for varying the thickness of said strip; to provide a safety device whereby the machine will be automatically stopped (although the driving pulley still continues to rotate) if the machine should become clogged, thereby obviating breakage and straining of various parts; to provide means whereby the solder ribbon is grooved in cross section before it enters the spiraling head; and to provide means whereby if two caps should happen to enter the feeding mechanism at once, one of these caps may be automatically snapped out of the machine.

With these and other objects in view, as brought out in the following description, my invention consists in the construction and combinations of parts, as hereinafter described and claimed.

In the accompanying drawings—Figure 1 is a side view of my complete machine, parts being broken away. Fig. 2 is a side view taken from the opposite side. Fig. 3 is a front view of the machine. Fig. 4 is a top plan view of the flattening rollers, with the means for driving them. Fig. 4ª is a perspective view of a coupling disk. Fig. 5 is a cross section on the line 5—5 of Fig. 4. Fig. 6 is a cross section on the line 6—6 of Fig. 4, looking in the direction of the arrows. Fig. 7 is an enlarged perspective view of the means for adjusting the rollers to vary the thickness of the solder ribbon. Fig. 8 is an enlarged side elevation of the grooving rollers and their support. Fig. 9 is a cross section of the same, taken on the line 9—9 of Fig. 8. Fig. 10 is an enlarged detail view, partly in section, of the safety device. Fig. 10ª is a horizontal section of a portion of the same. Fig. 11 is a cross section thereof on the line 11—11 of Fig. 10. Fig. 11ª is a side view, partly broken away, of the clutch disks. Fig. 12 is a plan view, on a larger scale, of the cap feeding attachment and the means for operating the same. Fig. 13 is a cross section thereof, partly broken away, and taken on the line 13—13 of Fig. 12. Fig. 14 is a cross section of the cap snapping and feeding attachment, taken on the line 14—14 of Fig. 12. Fig. 14ª is a side view of the downwardly tapering plug. Fig. 15 is a top plan view of the separator disk. Fig. 16 is a cross section of the cap feeding and snapping attachment, taken on the line 16—16 of Fig. 14, looking in the direction of the arrows. Figs. 17, 18, and 19 are perspective views showing in detail various parts of the cap snapping attachment. Fig. 20 is a cross section on the line 20—20 of Fig. 14. Fig. 21 is a cross section on the line 21—21 of Fig. 14. Fig. 22 is a side view of the parts shown in Fig. 21, and Fig. 23 is a top plan view of one of the vibrating shutters.

The entire machine is supported on a solid casting 1, having an upwardly projecting portion 2, on which the support 3 for the flattening rolls is carried, it preferably being bolted thereto.

4 represents the casting carrying the main operating portion of the machine. The turn-table or turret 5, the spiraling head 6, the forming dies, plungers, and operating mechanism are substantially the same as those described in my former application, and it is thought they need no specific description in the present application, as they are not claimed in detail.

Of the specific improvements covered by this application, the means for producing a flat ribbon of solder of uniform size and thickness from a wire will first be described.

7 represents a bracket carrying a spool 8, on which is wound solder wire 9. In the support 3 are mounted two rolls 10 and 11. The roll 10 is provided with a central groove 12 and the roll 11 is provided with a projection or tongue 13, fitting into the groove 12. This groove 12 limits the width of the solder ribbon or strip formed, and the relative positions of the rolls 10 and 11 limit the thickness of said solder ribbon or strip. It is often desirable to vary the thickness of the solder ribbon or strip and for this reason, I provide means for adjusting the roll 10 relatively to the roll 11. The roll 11 is mounted on a shaft 14, and the roll 10 is carried by a shaft 15, said shafts being supported centrally by bearings 16, mounted in bearings in enlarged portions 18 of the extension 17. On the support 3 near one end thereof is an extension 17, made in the form of an elongated cylinder. The top of this cylinder is cut away and enlarged, as shown at 18, to form bearings for the rolls 10 and 11. On the top of the extension 17 is mounted an open frame 19, rectangular in its general outline and secured by bolts 20 to the top of the extension 17, and provided with bearings for the shafts 14 and 15, these shafts being preferably provided with sleeves 21.

The roll 10 may be adjusted to and from the roll 11 by the following means: 23 is a frame made in two parts, as shown in Fig. 4, each part being provided with a hub 22, projecting outwardly from and concentric with the part 24. Each of said hubs 22 is provided with a perforation located eccentrically relatively to the part 24, and each of these perforations carries on its interior a sleeve such as 21, within which the shaft 15 revolves. The hubs 22 are mounted in casings 18 and 19 in the casting 17. The frame 23 is adjusted in the following manner: One part of the frame is provided with a curved, toothed rack 24, which meshes with a pinion 25 carried on a short shaft 26, journaled in the part 17. On one end of this shaft is fixed a toothed wheel 27, Fig. 7, preferably provided with a central slot 28, into which a cold-chisel or screw-driver may be inserted to turn the part 27 and with it the shaft 26, but any other suitable means may be employed. The adjustment of the wheel 27 is effected in the following manner: 29 represents a cup or plate suitably secured in the extension 17 and provided with a series of holes 30. 31 represents a pin adapted to be passed through one of the openings 32 in the circumference of the wheel 27 and through one of the openings 30. This pin 31 may be made so as to screw into the holes 30, if desired. The depressions 32 in the wheel 27 are nearer together than are the holes 30 and are more numerous, sixteen of the openings 32 being used and only nine of the openings 30. It results that an exceedingly fine adjustment can be made, down to about a thousandth of an inch, by removing the pin 31, turning the wheel 27 slightly, and inserting the pin in another hole 30 in engagement with one of the depressions 32.

The means for operating the rolls 10 and 11 will now be described.

The shafts 14 and 15 extend out slightly beyond the extension 17 and each terminates in a tongue such as 201. The tongue 201 engages in a groove 202 of a coupling disk 200, the construction being the same on each of the shafts 14 and 15. The coupling disks have on the other side a groove, such as 205, at right angles to the groove 202, into which a tongue of the driving shaft enters.

203 and 204 represent the driving shafts, mounted in bearings 33 carried on pedestals projecting upwardly from the part 3 of the supporting casting, and these driving shafts are coupled to the shafts 14 and 15, respectively, by the coupling disks, hereinbefore described. The object of such disks is to remove any stress or strain from the shafts 14 and 15, due to the adjustment of the roll 10, as already described. Gear wheels 34 are secured to the shafts 203 and 204, these gear wheels being of the same size and meshing with each other, so that the movement of the shafts 203 and 204, and therefore of the shafts 14 and 15, will be uniform. Secured to the shafts 203 and 204 are pinions 38 and 39, these pinions having oppositely directed teeth. Loosely mounted on hubs extending from the pinions 38 and 39 are mutilated gear wheels 35 and 36, of larger diameter than the pinions 38 and 39. Each of the gear wheels 35 and 36 has a circular portion, such as 40, indicated in dotted lines in Fig. 6, extending out over the teeth of the pinions 38 and 39.

41 represents a link, which is perforated to extend over the shaft 203. On the upper end of the link 41 is pivotally mounted a pawl 42, which is pressed by a spring 43 against the teeth of the pinion 38 unless it is prevented from engaging said teeth by the curved extension 40 of the gear wheel 35. In order that the pawl 42 may be thrown out of engagement with the teeth on the pinion 38, I provide a pin 44, projecting from the pawl 42, and the spring 43 has an extension 45, adapted to fit in a notch in the top of the pawl, the result being that when the pawl is forcibly lifted by means of the pin 44 against the tension of the spring 43, the extension 45 of the spring will engage with the notch on the pawl and hold the pawl 42 out of contact with the pinion 38 until it is released. Similarly, a perforated link 46 is provided, which is loosely mounted on the shaft 204. The link 46 also carries at its upper end a spring-operated pawl 47, adapted to engage with the teeth of the pinion 39. The construction of the pawls and the pinions engaging therewith is precisely the same, except that the pawls and therefore the teeth of the pinions 38 and 39 are oppositely arranged.

The links 41 and 46 are joined together by a pair of arms or links 48, through the center of which passes a pivot pin 49, which is connected to a lever 50, operated from the main shaft of the machine. As the main shaft revolves, the lever 50 reciprocates and imparts motion to either the shaft 14 or 15, unless the pawls 42 and 47 are held out of engagement with the pinions 38 and 39, and this is determined by the tension of the solder strip or ribbon, as hereinafter described, or by the pawls being held out of engagement, as hereinafter described.

To prevent the strip of solder from sticking in the groove 12 of the roll 10, I provide a knife 51, projecting down into said groove, said knife being curved at the end to fit against the roll 10. This knife is carried by a cross piece 52, mounted in standards 53 on the frame 19.

The solder wire 9 is drawn in from the spool 8 through a tube 54 in the extension 17, and passes under the roll 10 and up between the rollers 10 and 11, emerging as a flattened strip or ribbon $9^a$. The tube 54 is a little higher than the groove in the roller 10, so that said roller may run in a liquid bath, if desired.

As shown in Figs. 1 and 2, the strip or ribbon of solder is led over a pulley 55, mounted in bearings fixed to the casting 4. It then passes over a pulley 56, mounted in a swinging frame; then over a pulley 57 mounted on the top of the cross head; then through a flattened guide 58, having several flattened rectangular openings, said guide being made of hardened steel, and the opening being approximately of the width that the solder ribbon is desired to have. It then passes down through the grooving rolls shown in Fig. 8, and then into the spiraling head 6.

The tension upon the solder ribbon $9^a$ is regulated in the following manner: The pulley 56 is carried on the ends of a swinging frame, which is composed of two arms 59 and 60. The arm 60 is loosely mounted on a suitable pivot on the enlarged portion 18 of the extension 17, and the arm 59 is attached to the partial gear wheel 36. Around the central part of the gear 35 is wound a flat spring 61, to the end of which is connected a coiled spring 62, the other end of which is connected to an eye 63 on the casting 4. The tendency of these springs is always to exert a pull on the partial gear wheels 35 and 36, and to throw the arms 59 and 60 back into the position shown in Figs. 1 and 2. If the tension on the solder strip $9^a$ is small, the ridges 40 on the gear wheels 35 and 36 will prevent the pawls 42 and 47 from engaging their respective pinions, ex- cept for a very short time, and if the tension is still further relaxed, these pawls may be prevented from engaging the pinions completely during the reciprocation of the lever 50. As, however, the tension on the solder ribbon $9^a$ increases, as happens when it is forcibly drawn into the spiraling head, the parts are brought back into the position shown in Figs. 1 and 2, whereupon the pawls move their respective pinions a short distance at every stroke of the lever 50, thus moving the rolls 10 and 11 very slowly. If the tension on the strip $9^a$ increases, the frame carrying the pulley 56 will be pulled nearer the casting 4 and the rolls will operate faster. This frame, therefore, vibrates slowly back and forth, according as the tension on the ribbon $9^a$ varies, thereby exactly governing the motion of the flattening rolls 10 and 11.

After passing through the guide 58, the ribbon of solder is delivered between the grooving rolls shown in Figs. 8 and 9. These rolls 64 and 65 are shown in section in Fig. 9. They are mounted on stub shafts carried in a bracket 66 and projecting upwardly from the spiraling head 6, said shafts being constructed with eccentric throws which provide means for the adjustment of rolls 64 and 65. The roll 64 is provided with a V-shaped groove, and the periphery of the roll 65 is V-shaped, so that the strip of solder $9^a$, which is flat, is grooved by passage through these rolls, as shown at $9^b$. After passing through these rolls, the grooved strip of solder enters the spiraling head, where it is spiraled, and rings are successively cut off, as described in my application above referred to.

The safety device will next be referred to, special attention being called to Figs. 1, 2, 3, 10 and 11.

67 represents the main driving pulley, driven by a belt from any suitable source of power. This pulley is provided with spokes 68 and a hub 69, extending inwardly as shown in Fig. 11. The pulley 67 revolves freely on the main shaft 70, except when it is keyed to it, as hereinafter described. Bolted to the hub 69 is a ring 71, provided with a series of depressions in its face, one side of each depression being blunt and the other inclined.

Keyed or otherwise fastened to the shaft 70 is a hub $71^a$, to which is fastened the driving gear wheel 72. The hub $71^a$ has fastened thereto, or made integral therewith, a disk 73, from which project at intervals tubes 74, which are internally screwthreaded. Within each of these tubes 74 is a plunger 75, provided with a rather blunt, pointed end, one side of said point being inclined considerably more than the other, as shown in Fig. 10, these plungers being adapted to seat in the depressions in the ring 71. Each of these plungers is normally forced inward toward the shaft 70 by means of a spring such as 76, pressing against the head of the plunger and against the end of a cap 77, which is adapted to screw into the tube 74, whereby the tension of the spring 76 may be adjusted, the plunger rod 78 passing freely through a perforation in the cap 77. Adjacent to the disk 73 but not attached thereto is a disk 79, L-shaped in cross section, as shown in Fig. 11, the inner part of which projects between the ring 71 and the hub 69 of the driving pulley.

The ring 71 is also provided with a series of radial holes, in each of which is mounted a leather disk 205$^a$, a spring 206, and an adjusting screw 207, by means of which the disk 79 is continued in its forward movement, thereby engaging with the plunger 75 mounted in the disk 73, preventing said plungers from again engaging with the ring 71 until properly positioned. The hub 69 is also provided with a perforation through which passes a pin 208, with an adjusting head 209 screw-threaded thereon. A spring 210 normally tends to force said pin outwardly. The inner part of this pin is enlarged, as shown at 211, passing through a perforation in the ring 71, and the part 79 is also provided with a perforation 212. The ring 79 is provided on its periphery with grooves or slots corresponding to the grooves or slots in the ring 71, and is also provided with raised portions 80, so that if for any reason the plunger should be disengaged from the ring 71, the pulley would be permitted to revolve freely and the plungers would not enter the grooves in the ring 71 every little while, which action, if it occurred, would produce a racking strain very injurious to the machine. The small gear wheel 72 meshes with a gear wheel 81, journaled in the casting 4, which drives the turret, operates the dies, the grooving rolls, and the spiraling head, as already described. It also engages with a gear wheel 82 on a shaft 83, which shaft is provided with a crank arm 84, pivotally connected to the lever 50, whereby the flattening rolls are operated, as already described.

The operation of the safety device is as follows: If any undue resistance should occur, such, for example, as a wrench or other piece of iron falling into the gearing, the pulley 67 will continue to revolve, and the plungers 75 will be forced out of the notches in the ring 71 and will be carried along by friction until they ride up on the raised portions 80 of the ring 79, whereupon the pulley 67 will revolve freely without driving any part of the machine. After the obstruction is removed, the parts may be easily brought back into the original position by causing the pulley to be revolved relatively to the sleeve 71 and shaft 70, which can be done by turning the same backward and pressing in the pin 208 against the tension of the spring 210, until it enters the hole 212 in the ring 79, whereby the grooves in the ring 71 and ring 79 are locked in proper alinement.

The ribbon of solder after passing through the grooving rolls is fed down through the spiraling head and rings successively severed therefrom, one ring being dropped into each die of the revolving turret or turn-table 5, the operation of the machine being so timed as to cut and deliver one ring just as each receptive die comes under the spiraling head, as described in my former application. As the turn-table is advanced step by step, the hem is brought under the cap feeding mechanism, which will next be described. This mechanism is shown in Figs. 1, 2, and 3 as attached to the machine, and is shown in detail and on a larger scale in Figs. 12 to 23.

The cap feeding mechanism includes a casting 83, having a central perforation 84, through which the caps are dropped one at a time. On the bottom of the casting 83 are pivotally mounted a plurality of shutters 85, each provided with a curved slot such as 86. These shutters are arranged to be moved toward and away from each other. In all cases, they do not fit closely together, but close the bottom of the opening 84 enough so that a cap cannot be dropped through, as shown in Fig. 21. These shutters are opened and closed at the proper intervals, namely, when one of the dies carrying a solder ring is exactly centered under the cap feeding mechanism, by the following means: 87 represents a ring having a projecting portion or ear 88, to which is attached an arm 89. This arm 89 is attached to one end of a link 90. The other end of the link 90 is pivotally attached to an arm 119, which in turn is pivotally mounted on a pin 120, carried on the lower end of a crank arm 121, the connection being such as to practically allow a universal movement of the link 90. The crank 121 is mounted on a shaft 122, carried on a bracket 123, which is a part of the casting 4. The shaft 122 has projecting from it a pin 124, on which is slidably mounted a clip 125 flexibly attached to the lower end of an arm 126, which is secured to a part 127, which is a part of the frame which operates the dies, as described in my former application.

To the ring 87 are secured a series of projecting blocks 91, each of which is provided with a downwardly projecting pin 92, shown in dotted lines in Fig. 21, each of said pins being adapted to engage in the slot 86 of one of the movable shutters. As the ring 87 reciprocates, the timing thereof being properly controlled, the shutters 85 recede from each other at the proper times and allow a single cap to be dropped upon the ring of solder in the die beneath the feeding mechanism. The caps are supposed to be delivered singly down an inclined chute 93 into the opening 84. The outer part of the chute 93 consists of a solid casting 94, which preferably is made as an integral part of the casting 83, although it may be made separately and secured thereto, if desired. Secured on the top of the casting 94 is a perforated plate 95, which carries the separator, which consists of a stationary ring 96, having a central perforation 97 therein. Secured to the ring 96 is another ring $97^a$, cut away at its center and also cut away on one side for the reception of the feeding chute 98. Opposite the chute 98, the ring 96 is cut away for the reception of a vibrating disk 99, provided with overlapping knife-edged portions 100. Above the disk 99 is a downwardly tapering plug 101, and both the disk and the plug are secured to a shaft 102, the lower part of which is reduced in diameter and journaled in a bearing in the ring 96. A gear pinion 103 is attached to the shaft 102 near its lower end.

The plug 101 is provided with a stop piece 215, curved to correspond to the curve of the upper face of the plug, but extending slightly out beyond it, as shown in Fig. 14. This stop piece is for the purpose of pushing back any cap or caps that for any reason should get out of line in the column and tend to extend over or catch on the top of the plug, which would interfere with the feed. Said plug is also provided on its downwardly tapering sides with a series of V-shaped projections 216, preferably arranged at an angle of about 60°. These projections do not extend entirely around the sloping walls of the plug, but are interrupted as shown at 217, to allow the caps to pass from said projection onto the separator disk 99. The object of the V-shaped projections 217 is to hold back the column of caps, thus removing the greater part of the pressure of said column from the separator disk, as well as to agitate the caps and open the column slightly to facilitate the separation of the caps from the column.

The ring $97^a$ is cut away near its lower edge for the reception of the vibrating ring 104. This ring 104 carries a curved rack 105, adapted to mesh with the pinion 103, and the ring $97^a$ is cut away, as shown at 106, to afford a space for this vibrating rack. The ring 104 is vibrated in the following manner: To said ring is attached a downwardly projecting pin 107, and on the lower part of this pin is pivoted an arm 108, the other end of which is pivoted to an extension on the ear 88 of the ring 87, so that the reciprocation of said lever 89 causes the reciprocation of the ring 104, and thereby a reciprocation of the separating disk 99.

The bottom of the chute 98 is preferably provided with a flat steel rod 109, having its lower end preferably bent as shown at 110, the column of caps resting upon said bent lip 110 and the disk 99. This flat rod is preferably adjustable by means of the screw 111, which works in a slot in the bottom of the chute 98.

I prefer to provide positive means for forcing the lowest member of a row of caps downwardly, in order that said caps, which often have raw edges, may be prevented from sticking in the chute 98. To this end, the chute 98 is slotted at two places, as shown at 112, and within these slots are located the projecting plungers 113 on a sliding lever 114. This lever slides in suitable guides provided under the bottom of the chute 98, and is operated by means of an arm 115 centrally pivoted to said lever and having one end pivoted at 116 on an extension of the chute 98. The arm or lever 115 is operated by means of a link 117, pivoted to said arm at one end and having the other end pivotally connected to a projection 118 on the ring 104.

Ordinarily but one cap will be fed through the opening 97 into the chute 93, but it sometimes happens that the caps supplied are imperfect, being notched on the edge, for example, so that occasionally two caps will be dropped through the opening 97, and I have provided special means whereby, if this happens, only one cap will be delivered to the die through the opening 84, the other cap or caps being forcibly snapped out of the machine. This means is shown in Figs. 12 to 19, inclusive. The chute 93 is provided near its lower end with a stop 128, against which the lowermost cap or caps rest, in the event of more than one cap being fed at a time into the chute 93, until forcibly ejected or snapped out of said chute. This stop is located in the center of the chute. A little way above this stop, the sides of the chute are left open, on one side, for the operation of the cap snapping devices, and on the other side, as at 129, to leave an opening through which the extra cap or caps may be snapped onto the apron 130. A box 131 is attached to the bottom of the chute 93 at about its center. This box is provided with a partial top 132, beveled on its under side as shown in Fig. 16. In the box a cap snapper slide 133 is adapted to move freely. This slide consists of two side pieces, an end piece, the top and bottom being open, and on the closed end a rod 134 is provided, which projects loosely through an opening in the side of the box 131 and has a milled head 135 attached to its outer screw-threaded end. A spring 136 normally tends to throw this slide to the right in the position shown in Fig. 16. The other ends of the side pieces are united by a block 137, having notched lugs 138, projecting upwardly therefrom.

139 represents a pivoted catch supported on the box 131 and adapted to fall by its weight into the notches in the parts 138, normally holding these parts in the position shown in Fig. 16.

Pivotally mounted in the slide 133 is the cap snapper 140, having an inclined portion 141 and a projection 142, which projection and inclined portion serve to limit the movement of the cap snapper in one direction. The cap snapper is also provided with an upwardly projecting finger 143, which is adapted to strike a cap, if there be one, resting on the bottom of the chute 93 and against the stop 128, and throw said cap out through the opening 129.

144 represents a screw passing through the bottom of the box 131, for the purpose of adjusting the height of the cap snapper. The box 131 is also provided with downward extensions 145, in which is pivoted a bent lever 146, having arms projecting upwardly and sidewise, for the purpose of restoring the cap snapper slide to its original position, as shown in Fig. 16. The extensions 145 terminate in a perforated guide 146$^a$, in which the plunger rod for releasing and resetting the cap snapper slide plays freely.

147 represents an upwardly extending bracket secured to the part 83, on which is mounted an inclined guide sleeve 148. Carried by said sleeve and adjustably secured thereto by screws 149 is a cap stripping device 150, the lower end of which is shaped in the form of a ring 151. Within the fixed sleeve 148 is mounted a sliding sleeve 152, having gear teeth 153 on one face thereof. Within the sliding sleeve 152 is mounted a rod 154, which carries at its lowest end a magnet 155. The upper end of the rod 154 is reduced in size and a spring 156 surrounds said reduced portion, allowing a slight play to the rod 154 within the movable sleeve 152. The upper end of the rod 154 is screw-threaded, as shown in Fig. 16, and is provided with an adjusting nut 213 and a locking nut 214, providing for adjustment of said rod and securing it in its proper place when adjusted. The lower part of the sleeve 152 is expanded, forming a head 157, Fig. 16. This head is provided with slots in which the rods 158 are adapted to slide. The head is perforated on each side, as shown at 159, and within these perforations, inside of the rods 158, are leather friction plugs 160, held up against the rods 158 by springs 161. To the lower ends of the rods 158 is attached a ring 162, adapted to slide down inside the side walls of the chute 93, as shown in Fig. 16. The lower part of this ring is extended as shown at 163, and this serves as a stop and a centering ring for the cap. In the operation of these parts, the sleeve 148 and the parts 150 and 151 are stationary while the sleeve 152, rod 154, magnet 155, rods 158, and ring 162 are all movable.

The sleeve 152 is operated in the following manner: 164 indicates a shaft to which is keyed a mutilated gear wheel 165, having teeth adapted to engage with the teeth 153 on the sleeve 152. As shown in Fig. 1, the shaft 164 extends nearly to the back of the casting 4 and is operated by the means which operate the spiraling head, as hereinafter described.

The means for operating the cap snapping attachment will next be described.

To the shaft 164 is keyed a sleeve 166, having ears 167 projecting therefrom, and in these ears is pivotally mounted a projecting portion 168, carried by the plunger rod 169. This plunger rod is guided by a sleeve 170 and also by the sleeve 146$^a$, as already described. The lower end of the plunger rod is cut away, as shown at 171, and in the cut away portion is pivotally mounted a trigger 172, against which a spring 173 bears, normally tending to throw the upper end of said trigger away from the plunger rod, this motion being limited by a projection 174 on the lower end of the trigger.

The operation of the cap snapping attachment is as follows: Suppose that two caps fall through the opening 97 and slide down the chute 93 until they strike against the centering ring 163. At the proper moment, timed by the movement of the turn-table, the shaft 164 is partially rotated, forcing down the magnet 155 and its associated parts. The magnet passes through the ring 151 and picks up the top cap, leaving the other cap or caps resting against the stop 128. On the reverse motion, the magnet 155 is retracted and the ring 151 separates the cap from the magnet, the cap dropping with its lower edge below the stop 128 and sliding down to be delivered through the opening 84. Meantime, the cap snapping attachment has been operated in the following manner: The plunger rod 169 has been forced downwardly, the end of the trigger 172 yielding, and passing down below the stop or lock 139. On the upward movement of the plunger, the trigger 172 engages the lock 139 and lifts it out of engagement with the notched projections 138 of the slide, whereupon the spring 136 carries the cap snapper slide to the right from the position shown in Fig. 16, the finger 143 striking against any cap or caps resting on the bottom of the chute and snapping them out through the opening 129. This movement of the slide swings the horizontal arm on the lever 146 against the bottom of the trigger 172, and on the next downward movement of the plunger rod 169, the trigger 172 acts on the lever 146, bringing the slide back into the position shown in Fig. 16, whereupon it is secured by the lock 139 dropping by gravity into the position shown in Fig. 16.

The means for operating the shaft 164 will next be described, special reference being made to Figs. 1, 12 and 13.

175 represents a shaft for operating the spiraling head, which, by means of the crank connections as described in my application heretofore referred to, causes the shaft 176 to reciprocate at the proper times. On the casting 4 is mounted a bracket 177, and on a pin in this bracket is mounted the lever 178, which is operated by a lever 179 on the shaft 175. Attached to the top of the bearing on the lever 178 is an arm 180, having a segmental gear 181 thereon. On a part of the casting 4 is mounted a right-angled bracket 182, having a bearing 183 for the shaft 184. This shaft has on its lower end a pinion 185, meshing with the gear 181, and secured to its upper end is a toothed pinion 186, which rests upon a split washer 187. Resting on said washer 187 is a casing 188, and in a projection therein is mounted a rod 189, carrying a pawl 190, adapted to mesh with the teeth of the pinion 186, a spring 191 normally holding said pawl in contact with said pinion. Attached to the top of the casing 188 is a link 192, which link is connected to a sliding bar 193, movable in guides 194. The outer end of this bar is provided with a rack 195, which engages with a pinion 196 on the shaft 164. From the connections described, it is obvious that as the spiraling head is moved, the segmental gear 181 will also be moved back and forth. This will cause a vibratory movement of the pinion 186, but on its return movement this pinion will not actuate the link 192 and bar 193, thus permitting a dwell at the proper time.

The general operation of the machine is as follows: A solder wire is fed between the rolls 10 and 11 and the machine started and the wire flattened. As it emerges from the rolls, the flattened wire passes over the pulley 55, the tension pulley 56, the pulley 57, through the guide 58, between the grooving rolls, and down into the spiraling head. As soon as the machine has been operated long enough to form a spiral of sufficient size on the spiraling head, the chute 98 is filled with caps and the machine operates automatically as long as the supply of caps and solder continues. The caps are supposedly delivered one by one through the opening 97 into the chute 93, and thence through the opening 84 on to a ring of solder carried by a die, the turn-table having been revolved and locked so that it is directly under the opening 84. If, owing to an accident, more than one cap should be fed through the opening 97, only one cap will be fed through the opening 84, because the cap snapping attachment snaps out the extra cap or caps, as already described. In other respects, the general operation is the same as that described in my application above referred to. Should any hard obstruction fall between the gears, or should the machine become clogged or run hard, for any reason, the safety device will be thrown into operation and the driving pulley will run freely until the machine is put in proper condition again.

I do not limit myself to the exact construction shown and described, as this could be changed in many particulars without departing from the spirit of my invention.

I claim:—

1. In a machine for making solder hemmed caps, the combination of a pair of rolls, one provided with a groove and the other provided with a projection adapted to fit in said groove, means for feeding a strip of metal between said rolls, whereby said strip is flattened out into a ribbon, means for severing parts from said flattened ribbon and hemming the severed portions upon can caps, and means for operating said rolls, said means being governed by the tension of the flattened ribbon as it is fed to the hemming devices, substantially as described.

2. In a machine for making solder hemmed caps, the combination of a pair of rolls, one provided with a circumferential groove and the other provided with a tongue adapted to fit into said groove, means for feeding wire solder between said rolls, whereby said wire solder is converted into a flattened ribbon of substantially uniform thickness and width, means for severing portions of said flattened ribbon and hemming them upon caps, means for exerting tension upon said ribbon as it passes from said rolls to the hemming devices, and operating devices for said rolls, the operation of which is governed by said tension devices, substantially as described.

3. In a machine for making solder hemmed caps, the combination of a pair of rolls, one of said rolls being grooved on its periphery and the other having a tongue fitting into said grooves, means for feeding solder wire between said rolls, whereby said wire is flattened into a ribbon of substantially uniform thickness and width, a vibrating tension device over which said flattened ribbon passes, cap hemming devices to which said ribbon is delivered, and operating means for said rolls, the amount of movement given said rolls by said operating means being governed by said tension device, substantially as described.

4. In a machine for making solder hemmed caps, the combination of tongue and grooved rolls for flattening a strip of solder into a ribbon of substantially uniform thickness and width, guiding devices for said ribbon, a vibrating frame having a pulley at one end, over which said ribbon passes, hemming devices, and operating means for said rolls, including a constantly operating shaft and pawl and ratchet devices whose action is governed by the position of said vibrating frame, substantially as described.

5. In a machine for making solder hemmed caps, the combination of tongue and grooved rolls for flattening a wire of solder into a ribbon of substantially uniform thickness and width, guides over which said ribbon passes, a vibrating tension frame provided with a pulley at one end, over which pulley said ribbon passes, a knife projecting into the space between said rolls, and operating means for said rolls, including a constantly rotating shaft, intermittently acting pawl and ratchet devices whose action is governed by said vibrating frame, and connections between said pawl and ratchet devices and said shaft, substantially as described.

6. The combination of tongue and grooved rolls, means for operating said rolls, and means for adjusting one of said rolls toward and away from the other, including a swinging frame, eccentric devices carried by said frame, through which the shaft of one of said rolls passes, and means for moving and locking said frame, including a shaft engaging said frame, a gear wheel mounted on said shaft, a supporting frame provided with holes, and a pin adapted to be placed between two of the teeth of said gear wheel and engaging one of said holes, substantially as described.

7. The combination of tongue and grooved rolls, a supporting frame therefor, a shaft for each of said rolls, passing through said frame, and means for adjusting one of said rolls toward and away from the other, including a swinging frame, eccentrics carried by said frame, through which the shaft of one of said rolls passes, said frame being provided with a rack, a shaft provided with a pinion engaging said rack, said shaft being also provided with a toothed wheel, said supporting frame being provided with a number of holes, and a pin adapted to be passed between the teeth of said wheel and into any one of said holes, substantially as described.

8. The combination of a supporting frame, tongue and grooved rolls, shafts for said rolls, passing through said frame, operating means for said shafts, and means for adjusting one of said rolls toward and away from the other, including a swinging frame provided with eccentrics through which the shaft of one of said rolls passes, said frame being provided with a rack, a shaft provided with a pinion engaging said rack, a toothed wheel mounted on said shaft, said supporting frame being provided with a plurality of perforations arranged in a circle and of less number than the teeth of said wheel, and a pin adapted to be passed between two of the teeth of said wheel and into one of said openings, substantially as described.

9. The combination of a supporting frame, tongue and grooved rolls, a shaft for each of said rolls, passing through said frame, operating means for said shafts, a separating knife extending into the space between said rolls, and means for adjusting one of said rolls toward and away from the other, including a swinging frame provided with eccentrics through which the shaft of one of said rolls passes, said frame being also provided with a rack, a short shaft mounted in said first named frame and provided with a pinion engaging said rack, a toothed wheel carried on said short shaft, said supporting frame being provided with a plurality of openings less in number than the teeth of said wheel, and a pin adapted to be passed between two of said teeth and into one of said openings, substantially as described.

10. The combination of tongue and grooved rolls, a supporting frame therefor, means for adjusting one of said rolls toward and away from the other, a knife extending into the space between said rolls, operating means for said rolls, and a tension device for the flattened strip of metal produced by said rolls, the action of the operating means being governed by the tension device, substantially as described.

11. The combination of tongue and grooved rolls adapted to produce a flat ribbon of metal, means for adjusting said rolls relatively to each other, a knife extending into the space between said rolls, a vibrating frame over which the flattened ribbon of metal passes, and operating devices for said rolls, including a constantly rotating shaft and intermittently acting connections between said shaft and the shafts of said rolls, the action of said devices being governed by said tension device, substantially as described.

12. The combination of tongue and grooved rolls, a shaft for each of said rolls, said shafts being geared together so that the rolls will revolve in unison, means for adjusting said rolls relatively to each other, said rolls being adapted to flatten a strip of metal passed between them, a vibrating tension frame over which the flattened ribbon of metal passes, and operating means for said rolls, including a constantly rotating shaft, pawl and ratchet devices, one for each of the roll shafts, the operation of said pawl and ratchet devices being governed by the vibrating tension frame, and connections between said pawl and ratchet devices and said constantly rotating shaft, substantially as described.

13. The combination of tongue and grooved rolls, a shaft for each of said rolls, said shafts being geared together and each of said shafts being provided with a ratchet wheel, a vibrating tension frame over which the flattened ribbon of metal produced by said rolls passes, segmental gear wheels engaging with each other, one mounted loosely on each of said roll shafts, said frame being connected to one of said gear wheels, and each of said segmental gear wheels being provided with a curved portion extending over a part of the corresponding ratchet wheel, a spring connected to one of said segmental gear wheels, spring pressed pawls, one of which is adapted to engage with each of said ratchet wheels at certain times, an operating shaft, and connections between said pawls and said shaft, substantially as described.

14. The combination of tongue and grooved rolls, means for adjusting said rolls relatively to each other, a shaft for each of said rolls, said shafts being geared together, a pinion wheel on each of said shafts, a vibrating tension frame, segmental gears loosely mounted on said shaft, engaging with each other, and each having a curved portion extending over the corresponding ratchet wheel, and one of said gears being connected to said vibrating frame, spring devices connected to the other of said segmental gears, spring-pressed pawls normally adapted to be thrown into engagement with said ratchet wheels, but provided with means whereby they may be held out of engagement with said ratchet wheels, and means for operating said pawls, substantially as described.

15. In a machine for making solder hemmed caps, the combination of tongue and grooved rolls, means for adjusting said rolls relatively to each other, a knife projecting into the space between said rolls, tension devices, including a vibrating frame over which the flattened strip of metal produced by said rolls passes, guides for said strip, means for severing pieces off of the end of said ribbon and hemming them upon caps, a shaft on which each of said rolls is mounted, said shafts being geared together, and operating means for said rolls, including a constantly rotating shaft, a ratchet wheel and pawl for each of said shafts, and connections between said constantly rotating shaft and said pawls, so arranged that the movement of the vibrating frame governs the engagement of said pawls with said ratchet wheels, substantially as described.

16. In a machine for making solder hemmed caps, the combination of tongue and grooved rolls, means for adjusting said rolls relatively to each other, guides over which the flattened ribbon of metal produced by said rolls passes, a vibrating tension frame provided with a pulley, over which said ribbon passes, means for grooving said ribbon, severing split rings from the end thereof, and hemming the same upon caps, shafts actuating the flattening rolls, said shafts being geared together and each provided with a ratchet pinion, segmental gears geared together and loosely mounted one on each of said roll shafts, said vibrating frame being attached to one of said segmental gears, a spring attached to the other of said segmental gears, said gears having curved portions extending over the ratchet pinions, spring-pressed pawls adapted to intermittingly engage said ratchet pinions, and means for operating said pawls, including a constantly rotating shaft, and connections between said rotating shaft and said pawls, substantially as described.

17. In a machine for making solder hemmed caps, the combination of hemming mechanism and means for feeding can caps, one at a time, to said hemming mechanism, said means including devices for snapping superfluous caps out of the machine, if more than one cap happens to be fed at a time, substantially as described.

18. In a machine for making solder hemmed caps, the combination of hemming mechanism and means for feeding can caps, one at a time, to said hemming mechanism, said means being provided with spring operated devices for snapping superfluous caps out of the feeding mechanism, if more than one cap is fed at a time, substantially as described.

19. In a machine for making solder hemmed caps, the combination of hemming mechanism and means for feeding can caps, one at a time, to said hemming mechanism, said means being provided with devices for picking up and temporarily holding the caps one by one, and snapping out from said feeding mechanism the superfluous caps, if more than one is fed at a time, substantially as described.

20. In a machine for making solder hemmed caps, the combination of hemming mechanism and means for feeding caps, one at a time, to said hemming mechanism, said means including a magnet for picking up the caps one at a time and holding them temporarily, devices for operating said magnet, and means for snapping the superfluous caps out of the feeding mechanism, if more than one is delivered beneath said magnet at a time, substantially as described.

21. In a machine for making solder hemmed caps, the combination of hemming mechanism and means for feeding can caps, one at a time, to said hemming mechanism, said feeding mechanism including means for separating the lowest one of a column of caps, a magnet for lifting and temporarily holding the cap as it passes through said feeding mechanism, and devices for snapping superfluous caps out of the feeding mechanism, if more than one cap passes through said separator at a time, substantially as described.

22. In a machine for making solder hemmed caps, the combination of hemming mechanism and mechanism for feeding can caps, one at a time, to said hemming mechanism, said last named mechanism including devices for temporarily holding the cap as it passes through said feeding mechanism, a spring-operated snapper normally locked and adapted to force superfluous caps out of the feeding mechanism, if more than one should be delivered therethrough at a time, and devices for unlocking said cap snapping devices, substantially as described.

23. In a machine for making solder hemmed caps, the combination of hemming mechanism and mechanism for feeding can caps, one at a time, to said hemming mechanism, said last named mechanism including devices for temporarily holding the cap as it passes through said feeding mechanism, a spring-operated snapper normally locked and adapted to force superfluous caps out of the feeding mechanism, if more than one should be delivered therethrough at a time, and devices for unlocking and resetting said cap snapping devices, substantially as described.

24. In a machine for making solder hemmed caps, the combination of hemming mechanism and feeding mechanism for delivering caps one at a time to said hemming mechanism, said feeding mechanism including devices for temporarily holding a cap as it passes through said feeding mechanism, a spring-operated snapper, a lock for holding said snapper out of operation, said snapper being provided with a bent lever, and a reciprocating plunger rod adapted at times to unlock said snapper and then reset the same, substantially as described.

25. In feeding mechanism for machines for making solder hemmed caps, the combination of a chute provided with a stop, a magnet, means for reciprocating said magnet above said chute, thereby lifting a cap and holding it temporarily, a spring-operated snapper slide, a snapper adjustably pivoted in said slide, a bent lever carried by said slide, a lock for normally locking said snapper slide, a reciprocating plunger provided with a trigger for unlocking said snapper slide and for resetting it, and means for operating said magnet and said plunger rod, substantially as described.

26. In feed mechanism for machines for making solder hemmed caps, the combination of a centrally perforated casting, shutters normally movable to prevent the passage of caps through said casting, means for moving said shutters, an inclined chute provided with a stop, a separator adapted to deliver caps one at a time into said chute, means for temporarily lifting and holding a cap as it slides down said chute and is arrested by said stop, and means for snapping superfluous caps out of said chute, if more than one cap is delivered thereinto at a time, substantially as described.

27. In feed mechanism for machines for making solder hemmed caps, the combination of a centrally perforated casting, shutters adapted to arrest the passage through said casting of caps, means for moving said shutters to allow a cap to drop through said casting, a chute provided with a stop and connected with said casting, a separator adapted to deliver caps, one at a time, into said chute, a magnet adapted to pick up a cap and temporarily hold it as it slides down said chute and strikes said stop, devices for removing superfluous caps from said chute, if more than one cap is delivered thereinto at a time, devices for removing from said magnet the can cap picked up thereby, and means for operating said magnet and said removing device, substantially as described.

28. The combination of an inclined chute provided with a stop, a spring-operated snapper slide having a snapper adjustably pivoted therein, a bent lever operated by said snapper slide, a lock for said snapper slide, a plunger rod having a trigger adapted to unlock said snapper slide and then to reset said slide by means of said lever, and means for reciprocating said plunger rod, substantially as described.

29. In feed mechanism for machines for making solder hemmed caps, the combination of a centrally perforated casting, shutters adapted to partially close the perforation in said casting, means for operating said shutters, a chute connected to said casting and provided with a stop, a separator adapted to deliver caps one by one into said chute, said separator being centrally perforated and provided with plungers for forcing down the lowest cap of a column, and means connected to the shutter operating means for operating said plungers, substantially as described.

30. In feed mechanism for machines for making solder hemmed caps, the combination of a separator composed of a centrally perforated casting, a vibrating separator disk provided with overlapping sharp edges, means for vibrating said disk, a chute delivering into the central part of said separator, plungers adapted to force onward the lowest member of a column of caps, and means for reciprocating said plungers, substantially as described.

31. In feed mechanism for machines for making solder hemmed caps, the combination of a centrally perforated casting, a chute connected thereto and provided with a stop, a magnet adapted to pick up a cap as it is arrested by said stop, snapping devices for removing from said chute superfluous caps, if more than one is fed into said chute at a time, means for reciprocating said magnet, devices connected to said means for unlocking and resetting the snapping devices, and centering and stripping devices acting in connection with said magnet, substantially as described.

32. In feed mechanism for machines for making solder hemmed caps, the combination of a centrally perforated casting, a chute provided with a stop, a magnet arranged at right angles to said chute, means for reciprocating said magnet, centering devices and an adjustable stripper ring for removing from said magnet the cap picked up thereby, substantially as described.

33. In feed mechanism for machines for making solder hemmed caps, the combination of an inclined chute provided with a central stop and with an opening in its side just above said stop, a cap snapper slide, a cap snapper pivotally and adjustably mounted in said slide, a spring for operating said slide in one direction, a lock for normally holding said snapper slide out of operation, a bent lever carried on an extension of said chute, a plunger rod provided with a spring actuated trigger for releasing said snapper slide from its lock and for returning it to its original position, and means for reciprocating said plunger rod, substantially as described.

34. In a machine for making solder hemmed caps, the combination of a spiraling head, a turn-table, means for operating the same, mechanism adapted to feed a single cap at a time to said turn-table, said mechanism being provided with devices for removing superfluous caps therefrom, and operating means for said devices, including a shaft provided with a pinion, a plunger shaft operated by said first named shaft, a crank connected to said pinion, a segmental gear, a shaft provided with a pinion wheel meshing with said segmental gear and provided with a ratchet wheel and pawl, said segmental gear being operated by the lever which operates the spiraling head, substantially as described.

35. In a machine for making solder hemmed caps, the combination of a positively driven spiraling head and a pair of rolls having respectively a coöperating peripheral V-shaped tongue and groove, through which the ribbon of solder is drawn by the rotation of said spiraling head, substantially as described.

In testimony whereof, I affix my signature, in presence of two witnesses.

ELMER M. COBB.

Witnesses:
   JAMES R. PARSONS,
   A. G. McPHERSON.